US008979065B2

(12) United States Patent
Zhelyaskov et al.

(10) Patent No.: US 8,979,065 B2
(45) Date of Patent: Mar. 17, 2015

(54) PIEZOELECTRIC VALVE BASED ON LINEAR ACTUATOR

(71) Applicant: Discovery Technology International, Inc., Sarasota, FL (US)

(72) Inventors: Valentin Zhelyaskov, Sarasota, FL (US); Mark Oudshoorn, Parrish, FL (US); Serhiy Petrenko, Kiev (UA)

(*) Notice: Subject to any disclaimer, the term of this patent is extended or adjusted under 35 U.S.C. 154(b) by 0 days.

(21) Appl. No.: 14/193,122

(22) Filed: Feb. 28, 2014

(65) Prior Publication Data

US 2014/0246614 A1    Sep. 4, 2014

Related U.S. Application Data

(60) Provisional application No. 61/771,162, filed on Mar. 1, 2013.

(51) Int. Cl.
*F16K 31/00*    (2006.01)
*H01L 41/00*    (2013.01)

(52) U.S. Cl.
CPC ............. *F16K 31/004* (2013.01); *H01L 41/00* (2013.01)
USPC ...... 251/129.06; 251/284; 251/318; 251/326; 251/331; 310/321; 310/328; 310/357

(58) Field of Classification Search
USPC ................... 251/129.06, 284, 318, 326, 331; 310/311, 321, 323.01, 323.02, 328, 310/357
See application file for complete search history.

(56) References Cited

U.S. PATENT DOCUMENTS

| | | | |
|---|---|---|---|
| 4,059,081 A | 11/1977 | Kayanuma | |
| 4,127,097 A | 11/1978 | Takimoto | |
| 4,153,025 A | 5/1979 | Thornburgh | |
| 4,308,841 A | 1/1982 | Kingsley | |
| 4,326,489 A | 4/1982 | Heitert | |
| 4,527,532 A | 7/1985 | Kasai et al. | |
| 4,628,887 A | 12/1986 | Mitchell et al. | |
| 4,664,087 A | 5/1987 | Hamburg | |
| 4,700,683 A | 10/1987 | Uranishi et al. | |
| 4,741,416 A * | 5/1988 | Tanigawa | 251/129.06 |
| 4,944,276 A | 7/1990 | House et al. | |
| 5,431,010 A * | 7/1995 | Stone | 251/129.2 |
| 6,983,894 B2 | 1/2006 | Everingham | |
| 7,228,851 B2 | 6/2007 | Nakamura et al. | |
| 7,735,751 B2 * | 6/2010 | Ehlert et al. | 251/129.06 |
| 8,183,743 B2 | 5/2012 | Petrenko et al. | |
| 8,299,684 B2 | 10/2012 | Petrenko et al. | |
| 2010/0148102 A1 * | 6/2010 | Petrenko et al. | 251/129.01 |

OTHER PUBLICATIONS

Notification of Transmittal of the International Search Report and the Written Opinion of the International Searching Authority, dated May 27, 2014, from the corresponding PCT Application No. PCT/US2014/019407 filed Feb. 28, 2014.

* cited by examiner

*Primary Examiner* — John Bastianelli

(57) ABSTRACT

A piezoelectric valve has a body with an input passage and an output passage each configured to connect to a fluid flow system, a flow control member movable with respect to the valve seat between a fully open position and a closed position and a piezoelectric motor directly connected to the flow control member. The piezoelectric motor has a piezoelectric resonator in which two orthogonal vibrational modes across a length and a width of the piezoelectric resonator are excited, a working element and one or more contact sites providing frictional contact between the working element and the piezoelectric resonator. One of the working element and the piezoelectric resonator is connected to the flow control member and configured to move relative to the other of the working element and the piezoelectric resonator due to the frictional contact, thereby moving the flow control member.

20 Claims, 5 Drawing Sheets

PIEZOELECTRIC VALVE BASED ON LINEAR ACTUATOR

CROSS REFERENCE TO RELATED APPLICATION

The present application claims priority to U.S. Provisional Patent Application No. 61/771,162, filed Mar. 1, 2013, incorporated herein in its entirety.

TECHNICAL FIELD

The embodiments herein relate in general to precision control valves, and in particular to valves with a piezoelectric actuator.

BACKGROUND

Control valves come in a large variety, with many of the control valves being electromagnetic valves having electromagnetic actuators. Major performance disadvantages of these valves are their low special resolution and slow response times. Valves using piezoelectric actuators can also use hydraulic amplifiers installed between the stem and the piezoelectric actuator. Although there are advantages over electromagnetic valves, these valves also have many disadvantages. These disadvantages can include, but are not limited to, (1) a short travel range of no more than 35 microns, which, if expanded using a hydraulic amplifier, complicates the system, reduces the reliability and reduces the accuracy of the system; (2) degradation of the resolution of the system; (3) temperature drift of the hydraulic amplifiers, especially when working in close proximity to internal combustion engines, reducing the resolution of the actuator and compromising the flow control; and (4) increased energy consumption, as the actuator is always on, causing additional linear drift, which also reduces the valve resolution and control range.

BRIEF SUMMARY

The embodiments herein address the problems related to increasing valve control resolution, increasing valve reliability, reducing valve energy consumption, and extending flow control range. These objectives have been achieved with the embodiments disclosed herein.

One embodiment of a piezoelectric valve or actuator disclosed herein includes a body with an input passage and an output passage each configured to connect to a fluid flow system, a flow control member movable with respect to the inlet passage and the outlet passage between a fully open position and a closed position and a piezoelectric motor. The piezoelectric motor comprises a piezoelectric resonator in which two orthogonal vibrational modes across a length and a width of the piezoelectric resonator are excited, a working element and one or more contact sites providing frictional contact between the working element and the piezoelectric resonator. One of the working element and the piezoelectric resonator is connected to the flow control member and configured to move relative to the other of the working element and the piezoelectric resonator due to the frictional contact, thereby moving the flow control member. The piezoelectric motor is connected to a control system.

Methods of regulating a fluid flow are also disclosed, with one method comprising adjusting a position of a flow control member within a fluid passage by linearly moving the flow control member along a linear axis with a piezoelectric motor having a piezoelectric resonator in frictional contact with a working element Adjusting the position comprises exciting two orthogonal vibrational modes across a length and a width of the piezoelectric resonator, thereby generating movement of one of the working element and the piezoelectric resonator due to the frictional contact and moving the flow control member with the one of the working element and the piezoelectric resonator in which movement is generated.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
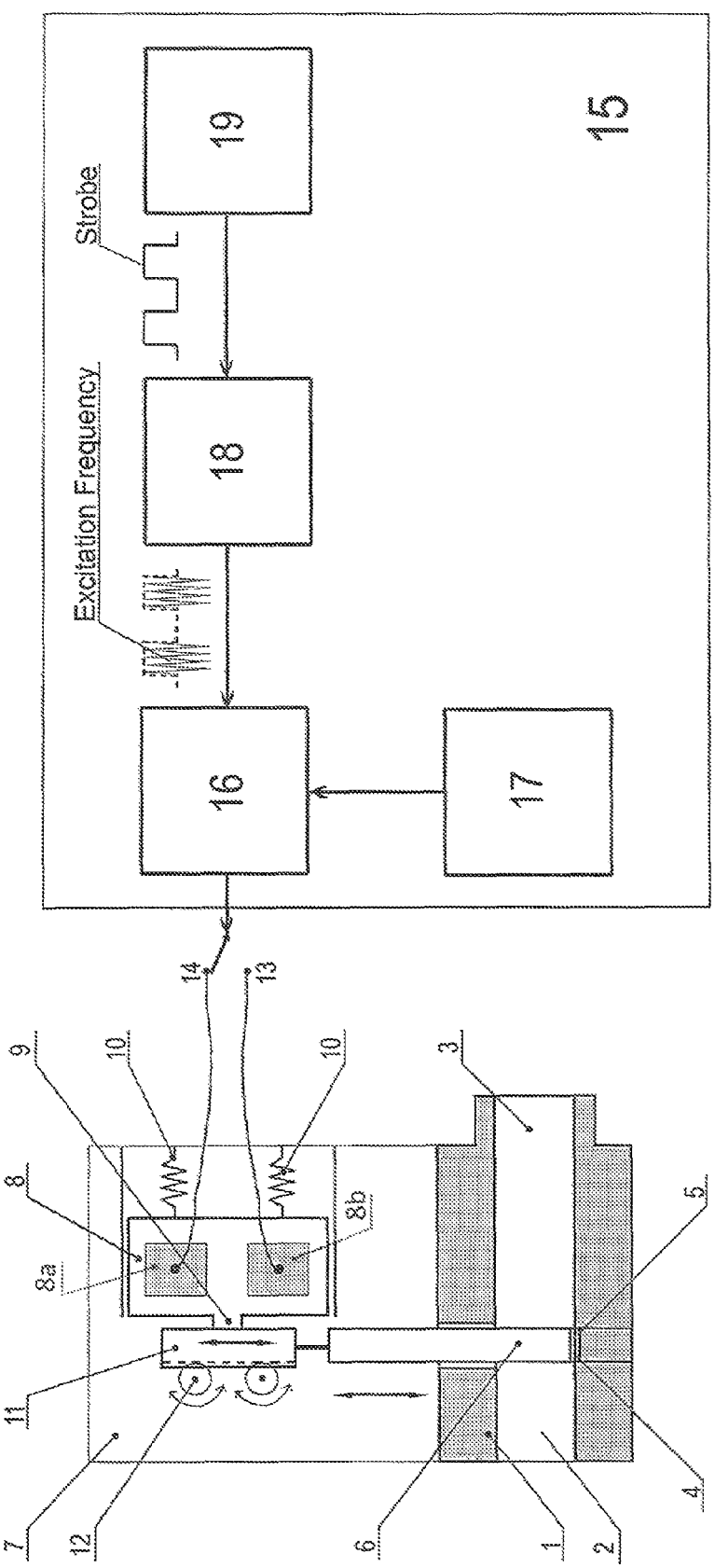
FIG. 1 is a simplified diagram of a piezoelectric valve in which a flat piezoelectric resonator is fixedly mounted on a valve body, and a working element is connected to a valve flow control member.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Disclosed herein are linear motion flow control valves that can accurately adjust flow rates to a multitude of values due to nano-scaled linear movement, providing multiple intermediate valve positions throughout the travel range of the valve, by using a single excitation frequency. Examples of specific types of valves are used herein for explanation, but are only provided as examples. The embodiments herein can be used with any linear motion valve known to those skilled in the art, including but not limited to gate valves, globe valves, fixed cone valves, needle valves, pinch valves, diaphragm valves, poppet valves and slide valves.

In the various embodiments herein, the control valves are operated with a piezoelectric resonator using one source of alternating voltage at a frequency to excite two modes simultaneously without the need for a special configuration of the excitation electrodes. Thus, a single excitation source combination resonator is provided in the various control valve embodiments. This single source is different from conventional means of providing nano-elliptical motion. Conventionally, such a system of excitation would require excitation of a piezoelectric resonator using two different sources of alternating voltage with equal frequencies, but shifted in phase relative to each other by approximately 90° and a special arrangement of electrodes. Such a two-generator excitation system is typically complex and requires that high stability of the phase relationship be maintained, as any unbalance directly affects the basic performance of the motor. This generally imposes additional requirements on the control of the excitation system and increases overall costs.

A piezoelectric control valve is shown in FIG. 1 and has a body 1 with input and output passages 2, 3 which are configured to connect to an external fluid flow system, such as a piping system through which a fluid flows. A flow control member 6 is movable across the input and output passages 2, 3, defining the change from the input passage 2 to the output passage 3. A valve seat 4 is positioned along the input and output passages 2, 3 to receive a distal end 5 of the flow control member 6 when the valve is in a closed position, blocking all flow from the inlet passage 2 to the outlet passage 3. In this way, the relative position of flow control member 6 regulates the quantity of fluid passing through the inlet and outlet passages 2, 3, thus regulating the fluid flow.

Figure 2:
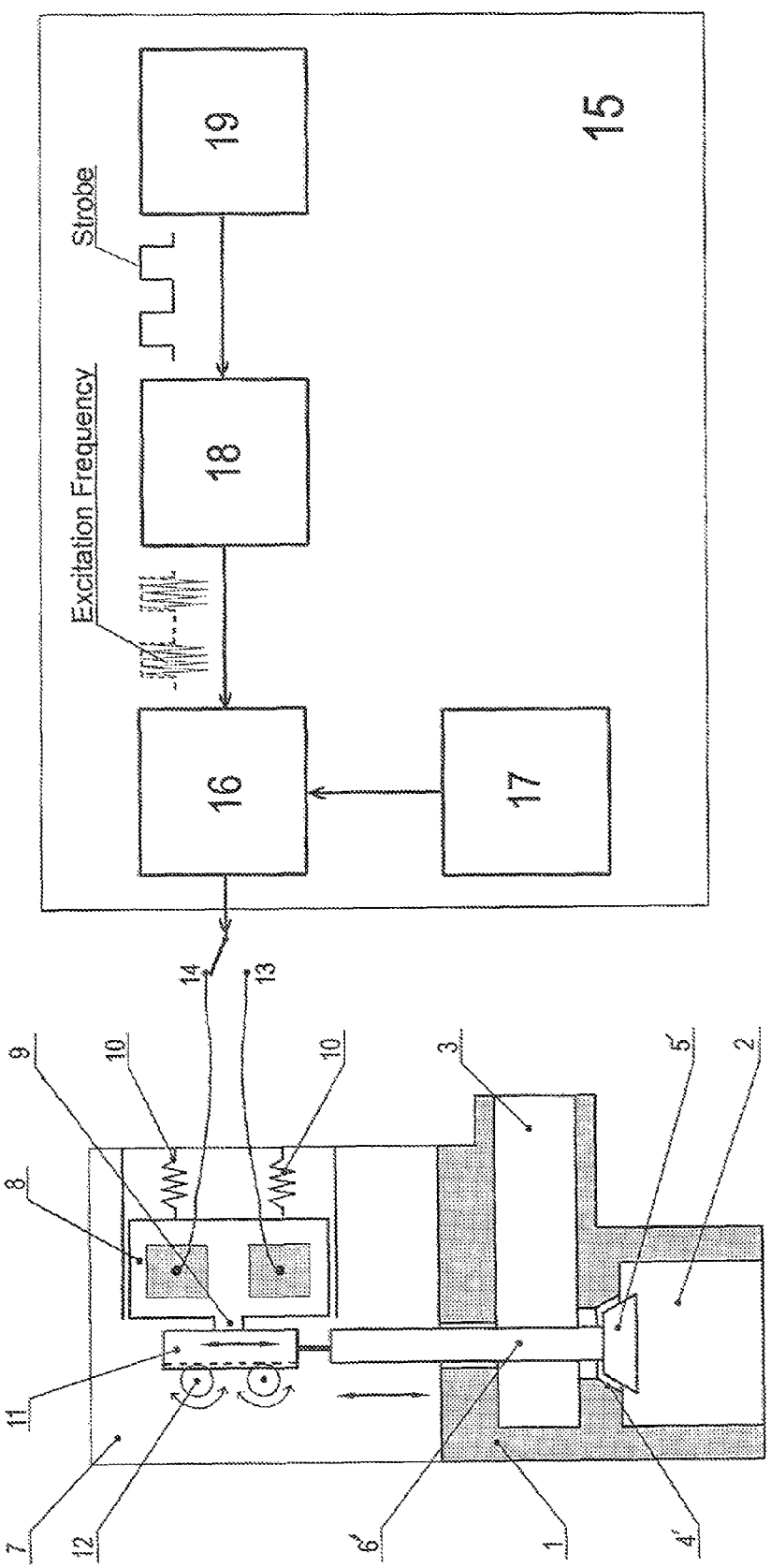
FIG. 2 is a simplified diagram of the piezoelectric valve in FIG. 1 in which the valve flow control member is a stopper connected to a valve stem.

FIG. 2 illustrates the piezoelectric control valve shown in FIG. 1, except that the flow control member 6 is illustrated as a stem 6' with a mobile stopper 5' connected to the stem 6'. The valve seat 4' of FIG. 2 actually includes an opening that allows flow between the input passage 2 and the output passage 3. The valve seat 4' is configured with a shape that corresponds to the mobile stopper 5', receiving the mobile stopper 5' in a friction fit when the valve is in a fully closed position. In this way, the relative position of mobile stopper 5' with valve seat 4' regulates the quantity of fluid passing through the opening of valve seat 4', thus regulating the fluid flow. FIG. 2 is provided as a non-limiting example of the different valve types that can be incorporated into the embodiments disclosed herein. Other non-limiting examples include gate valves, globe valves, fixed cone valves, needle valves, pinch valves, diaphragm valves, poppet valves and slide valves.

Referring back to FIG. 1, the flow control member 6 is connected to a linear motor 7. The linear motor 7 includes a housing or body, which can be integral with the valve body 1 or can be a different adjacent body portion. The linear motor 7 operates using a piezoelectric resonator 8. The piezoelectric resonator 8 can be formed of any suitable piezoelectric material. For example, the piezoelectric resonator 8 can be formed of barium titanate, or lead-zirconate-titanate (PZT). The linear motor 7 has a movable working element 11, which can be supported by a support structure 12. The support structure 12 illustrated in FIG. 1 comprises bearing rails and is provided as a non-limiting example. The working element 11 is configured to move linearly along the bearing rails, translating its movement to the flow control member 6, thus regulating the flow through the valve. The working element 11 can be made from a solid material, with steel being a non-limiting example.

The linear movement of the working element 11 results from the piezoelectric resonator 8, which can be a fixed flat resonator and can work on the principle of combination of excited standing acoustic longitudinal waves and contact with the working element 11. The piezoelectric resonator 8 frictionally contacts the working element 11 at a contact site 9. The frictional contact is assisted by a spring 10, configured to press the piezoelectric resonator 8 against the working element 11 at the contact site 9. As illustrated, the spring 10 is positioned between a wall of the piezoelectric resonator 8 and the linear motor 7. The spring 10 is illustrated as a non-limiting example, and other spring-like devices known to those skilled in the art can be used to bias the piezoelectric resonator against the working element 11.

The piezoelectric valve disclosed herein operates as follows. Excitation of two orthogonal vibrational modes across the length and the width of the piezoelectric resonator 8 causes motion of the contact site 9 along a nano-elliptical path. In general, the elliptical paths have amplitudes (i.e. dimensions of the minor and major axes) on the order of tens to hundreds of nanometers and are generally flat with respect to the direction of motion. That is, the major axis of the resulting elliptical paths is generally located in a direction parallel to the direction of motion.

In the various embodiments of the present invention, the nano-elliptical motion of the contact site 9 is formed by a superposition of two standing waves associated with orthogonal vibrational modes of the piezoelectric resonator 8 such that the points of maximum vibrational velocity correspond with the position of the contact site 9—that is, the points in the piezoelectric resonator 8 in which the standing waves of both of the orthogonal vibrational modes peak. The vibrational modes are excited by providing an excitation voltage via one of a pair of electrodes 8a, 8b associated with a lead 13, 14. That is, to provide nano-elliptical paths in a first direction and that provide force to the working element 11 in a first direction to one of open or close the valve, excitation voltages are provided at electrode 8a. The electrode 8a is fabricated from a conductive material, such as silver. To provide similar nano-elliptical paths, but that provide force to the working element 11 in an opposite direction to the other of open or close the valve, excitation voltages are provided at electrode 8b. It should be noted that other paths can be generated by the systems herein, including linear paths and paths orthogonal to X and Y axes.

The piezoelectric resonator 8 is provided with one or more leads, shown in FIG. 1 as leads 13 and 14, to connect to a control system 15. The control system 15 includes a pulse amplifier 16, which is connected to a suitable external power supply 17. A high frequency generator 18 produces the excitation resonant frequencies for the piezoelectric resonator 8, and a modulating device 19 determines the duration and the repetition rate of the group of high frequency pulses, which is connected to the input of the high frequency generator 18.

A high frequency signal corresponding to the excitation resonance frequencies of the piezoelectric resonator 8 is generated by high frequency generator 18. The high frequency signal is amplified by the pulse amplifier 16 and the signal is applied to a lead 13, 14 of the piezoelectric resonator 8. The piezoelectric resonator 8 is configured with a specific geometry and transverse polarization that causes excitation of two mutually orthogonal longitudinal waves. One frequency can be selected between the two orthogonal vibrational modes, exciting both modes simultaneously. The superposition of the two mutually orthogonal longitudinal waves creates nano-elliptical mechanical movement of the piezoelectric resonator 8 at the contact site 9. Since the contact site 9 is frictionally conjugated to the working element 11, the working element 11 moves linearly, consequently moving the flow control member 6 linearly. Accordingly, the distal end 5 of the flow control member 6 moves relative to the valve seat 4, moving away from the valve seat 4 to increase the flow through the valve. When the high frequency signal is applied to another of the leads 13, 14, the movement of the piezoelectric resonator 8 is reversed and the distal end 5 of the flow control member 6 moves relative to the valve seat 4, moving toward the valve seat 4 to decrease the flow through the valve.

Figure 5:
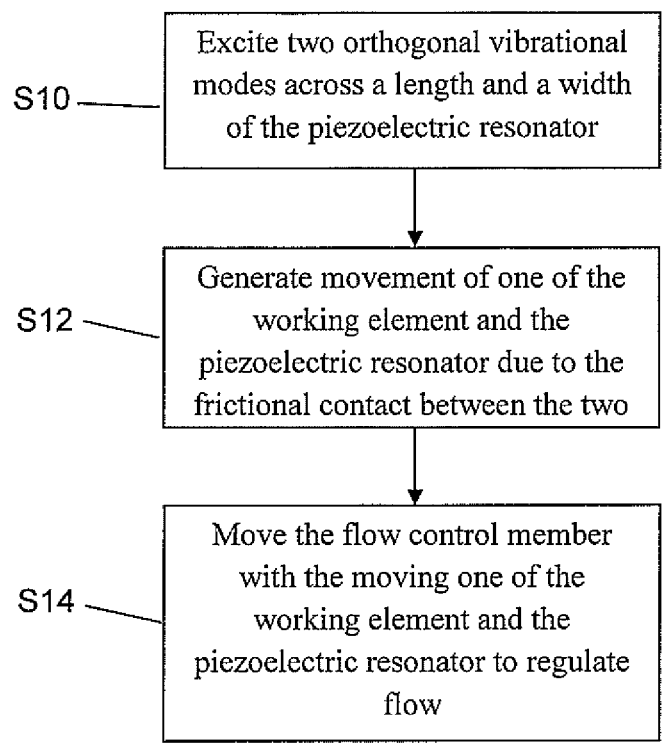
FIG. 5 is a flow diagram of a method of regulating flow rate as disclosed herein.

FIG. 5 is a flow diagram of a method of adjusting a flow rate using the control valve embodiments disclosed herein. In step S10, two orthogonal vibrational modes across a length and a width of the piezoelectric resonator are excited. This excitation generates movement of one of the working element and the piezoelectric resonator due to the frictional contact between the two in step S12. If the working element 11 is fixed, the piezoelectric resonator 8 will move, and if the piezoelectric resonator 8 is fixed, the working element 11 will move. The element capable of moving is in turn connected to and moves the flow control member in step S14.

In order to create micro/nano linear movements of the flow control member 6, pulses are generated at the output of the modulating device 19, the duration of which determines the linear step of the motor. Hence, high linear resolution is achieved by using the linear motor 7 in stepping mode, which provides high resolution of regulation of the flow.

Figure 3:
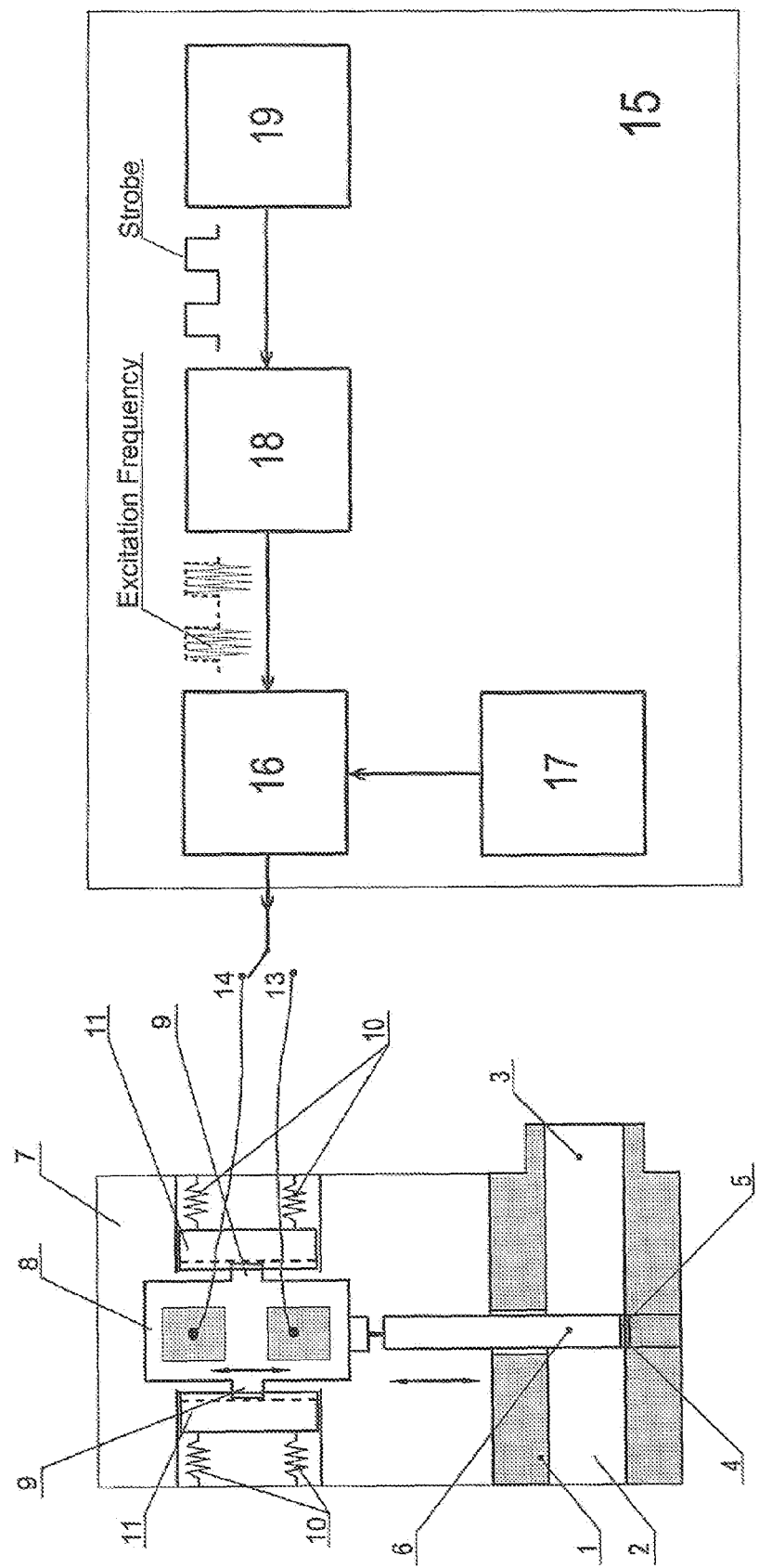
FIG. 3 is a simplified diagram of a piezoelectric valve with a flat piezoelectric resonator connected to the valve flow control member, and working elements attached to the body of the valve.

In another embodiment of a piezoelectric valve shown in FIG. 3, more than one working element 11 is used. The working elements 11 in FIG. 3 are implemented in the form of plates elastically attached to the body of the linear motor 7 rather than supported with the support structure 12, and rather than the piezoelectric resonator 8 being attached to the body. The piezoelectric resonator 8 has one contact site 9 with each of the working element 11. The working elements 11 are each spring loaded against the respective contact site 9 of the piezoelectric resonator 8 with springs 10. The spring 10 is illustrated as a non-limiting example, and other spring-like devices known to those skilled in the art can be used to bias the working elements 11 against the piezoelectric resonator 8. Accordingly, the piezoelectric resonator 8 is mobile relative to the valve housing 1 and is connected to the flow control member 6.

In order to achieve straight-line motion of the piezoelectric resonator 8, working elements 11 may be made with longitudinal grooves, along which the contact sites 9 move. The remaining description of the embodiment in FIG. 3 is analogous to the embodiment shown in FIG. 1.

Figure 4:
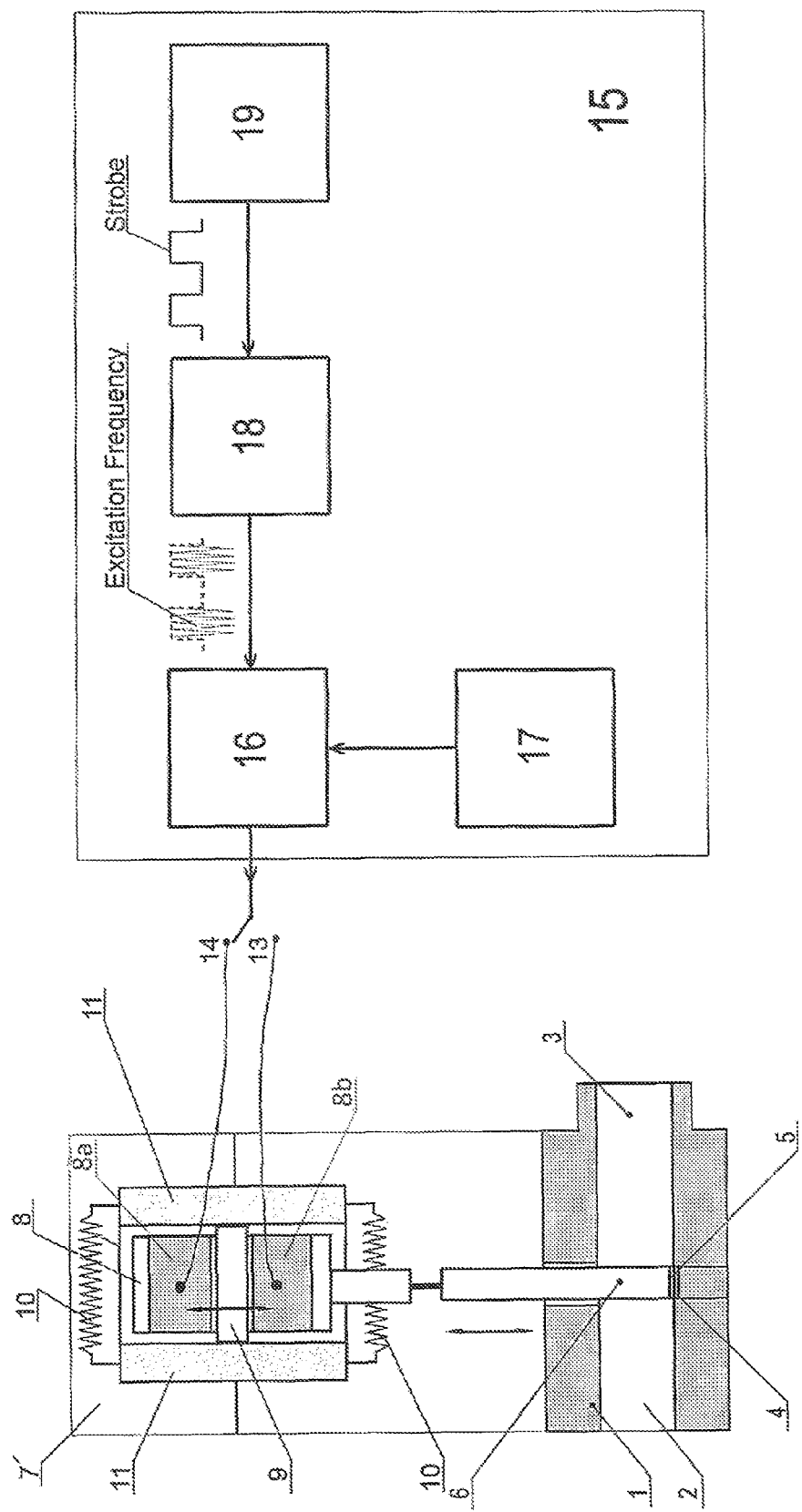
FIG. 4 is a simplified diagram of a piezoelectric valve in which the piezoelectric resonator is in the shape of a ring and is connected to the valve flow control member and cylindrical working elements are attached to the body of the valve.

In another embodiment of a piezoelectric valve, shown in FIG. 4, a tubular linear motor 7' is incorporated. The piezoelectric resonator 8 in this embodiment is polarized radially, i.e. the piezoelectric material forming the resonator is polarized in a direction perpendicular to the inner and outer cylindrical surface of the resonator, or can be polarized axially.

On an external surface of the piezoelectric resonator 8 are formed electrodes 8a, 8b. The piezoelectric resonator 8 can be situated within a cylindrical working element 11. Electrodes 8a, 8b are separated by an annular contact site 9 on the outer surface of the piezoelectric resonator 8. The contact site 9 is located midway along a length of the piezoelectric resonator 8. The contact site 9 can be integrally formed as part of the piezoelectric resonator 8. More particularly, the contact site 9 can be formed as a continuous annular band extending around the outer surface of the piezoelectric resonator 8. However, the invention is not limited in this regard and, in other embodiments, the contact site 9 can be segmented such that the surface of the contact site 9 is discontinuous around the circumference of the piezoelectric resonator 8. The contact site 9 engages with the inner surface of the working element 11.

The working element 11 is configured to provide a snug engagement with the contact site 9. This can be accomplished by any suitable means. For example, in some embodiments, the working element 11 can be formed of a spring steel and may include a slit provided along a length of the working element 11. The arrangement can be configured so that the piezoelectric resonator 8 is retained within the working element 11 under a spring tension exerted by the working element 11 itself or from spring-loading the working element 11 with springs 10. Alternatively, the piezoelectric resonator 8 can be snugly fit in the working element 11 by heating of the working element 11 during a manufacturing step. With the foregoing arrangement, energy can be directly applied to the working element 11 when the piezoelectric resonator 8 is excited and used in the linear motor 7' configuration of FIG. 4. The remaining description of the embodiment in FIG. 4 is analogous to the embodiment shown in FIG. 1, with the exception that the linear motor 7 runs on a combination of radial and longitudinal modes.

The embodiments of control valves disclosed herein can increase the range of movement of the flow control element of the valve to 10 mm or more, and thus greatly increase the range of adjustment of the flow. The minimum step for movement of the flow control member in this system can be as low as 1 nm, which substantially increases the resolution of the valve. This valve has essentially no drift and does not consume any power while the stem is not moving.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The methods herein can be implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. The methods can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein.

What is claimed is:

1. A method of regulating a fluid flow comprising:
    adjusting a position of a flow control member within a fluid passage by linearly moving the flow control member along a linear axis with a piezoelectric motor having a piezoelectric resonator in frictional contact with a working element, wherein adjusting the position comprises:
        exciting two orthogonal vibrational modes across a length and a width of the piezoelectric resonator, thereby generating movement of one of the working element and the piezoelectric resonator due to the frictional contact; and
        moving the flow control member with the one of the working element and the piezoelectric resonator in which movement is generated.

2. The method according to claim 1 further comprising receiving one frequency selected between the two orthogonal vibrational modes, the frequency exiting both of the two orthogonal vibrational modes simultaneously.

3. The method according to claim 1 further comprising:
    generating a frequency corresponding to excitation resonant frequencies of the piezoelectric resonator with a high frequency generator, the frequency provided through a pulse amplifier connected to an external power supply.

4. The method according to claim 3 further comprising:
    determining a duration and a repetition rate of a group of high frequency pulses with a modulating device connected to an input of the high frequency generator.

5. The method according to claim 1, wherein the flow control member comprises a slide.

6. The method according to claim 1, wherein the flow control member is a spool valve.

7. A piezoelectric valve comprising:
    a body with an input passage and an output passage each configured to connect to a fluid flow system;
    a flow control member movable with respect to the inlet passage and the outlet passage between a fully open position and a closed position; and
    a piezoelectric motor comprising:
        a piezoelectric resonator in which two orthogonal vibrational modes across a length and a width of the piezoelectric resonator are excited, the piezoelectric resonator configured to connect to a control system;
        a working element; and
        one or more contact sites providing frictional contact between the working element and the piezoelectric resonator, one of the working element and the piezoelectric resonator connected to the flow control member and configured to move relative to the other of the working element and the piezoelectric resonator due to the frictional contact, thereby moving the flow control member.

8. The piezoelectric valve according to claim 7, wherein the piezoelectric resonator is fixedly mounted on the body and the working element is connected to the flow control member so that the working element is movable relative to the piezoelectric resonator.

9. The piezoelectric valve according to claim 7, wherein the working element is fixedly mounted to the body and the piezoelectric resonator is connected to the flow control member so that the piezoelectric resonator is movable relative to the working element.

10. The piezoelectric valve according to claim 7, wherein the piezoelectric resonator is configured as a flat piezoelectric element with transverse polarization.

11. The piezoelectric valve according to claim 7, wherein the piezoelectric resonator is designed as an annular piezoelectric element with axial or radial polarization.

12. The piezoelectric valve according to claim 7 further comprising:
    a control system connected to the piezoelectric resonator, the control system comprising:
        a pulse amplifier connected to an external power supply, the pulse amplifier having an input connected to an output of a high frequency generator which generates a frequency corresponding to excitation resonant frequencies of the piezoelectric resonator, and the pulse amplifier having an output connected to the piezoelectric resonator.

13. The piezoelectric valve according to claim 12, wherein the control system further includes a modulating device configured to determine a duration and a repetition rate of a group of high frequency pulses, the modulating device connected to an input of the high frequency generator.

14. The piezoelectric valve according to claim 7, wherein the piezoelectric motor is configured to move the flow control member to a plurality of intermediate positions between the fully open position and the closed position to increase valve resolution.

15. The piezoelectric valve according to claim 7, wherein the piezoelectric resonator is configured to receive one frequency selected between the two orthogonal vibrational modes, the frequency exiting both of the two orthogonal vibrational modes simultaneously.

16. The piezoelectric valve according to claim 7, wherein the flow control member comprises a diaphragm.

17. The piezoelectric valve according to claim 7, wherein the flow control member comprises a gate.

18. The piezoelectric valve according to claim 7, wherein the flow control member comprises a slide.

19. The piezoelectric valve according to claim 7, wherein the piezoelectric valve is a spool valve.

20. The piezoelectric valve according to claim 7, wherein the flow control member comprises a stem connected to a stopper, the stem connected to the piezoelectric motor and the stopper configured to be received within a valve seat in the closed position.

* * * * *